US012492690B2

(12) United States Patent
Espinoza Fang et al.

(10) Patent No.: US 12,492,690 B2
(45) Date of Patent: Dec. 9, 2025

(54) OVERMOLDED COIL ASSEMBLY FOR A FUEL PUMP

(71) Applicant: PHINIA Jersey Holdings LLC, Wilmington, DE (US)

(72) Inventors: Oscar Daniel Espinoza Fang, Cuidad Juarez (MX); Robert Merkov, Webster, NY (US)

(73) Assignee: PHINIA Jersey Holdings LLC, Wilmington, DE (US)

( * ) Notice: Subject to any disclaimer, the term of this patent is extended or adjusted under 35 U.S.C. 154(b) by 206 days.

(21) Appl. No.: 18/197,181

(22) Filed: May 15, 2023

(65) Prior Publication Data

US 2024/0384711 A1 Nov. 21, 2024

(51) Int. Cl.

| | |
|---|---|
| ***F04B 17/04*** | (2006.01) |
| ***F02M 59/36*** | (2006.01) |
| ***F02M 59/46*** | (2006.01) |
| ***F02M 59/48*** | (2006.01) |

(52) U.S. Cl.

CPC ........... *F04B 17/04* (2013.01); *F02M 59/366* (2013.01); *F02M 59/466* (2013.01); *F02M 59/48* (2013.01)

(58) Field of Classification Search

CPC .. F02M 59/366; F02M 59/367; F02M 59/466; F02M 63/0015; F04B 17/04; F03M 59/48

See application file for complete search history.

(56) References Cited

U.S. PATENT DOCUMENTS

| | | | | |
|---|---|---|---|---|
| 4,830,333 A * | 5/1989 | Watson | ............... | F16K 31/0658 251/129.18 |
| 6,175,168 B1 * | 1/2001 | Budd | ...................... | H01F 7/127 310/34 |
| 6,446,606 B1 | 9/2002 | Krimmer et al. | | |

(Continued)

FOREIGN PATENT DOCUMENTS

| | | | | |
|---|---|---|---|---|
| DE | 102015212390 A1 * | 1/2017 | ......... | F16K 31/0675 |
| EP | 1967729 A1 * | 9/2008 | ........... | F02M 59/366 |

(Continued)

OTHER PUBLICATIONS

International Search Report of the International Searching Authority for application No. PCT/US2024/028143, dated Aug. 21, 2024 (2 pages).

*Primary Examiner* — Nathan C Zollinger

(74) *Attorney, Agent, or Firm* — WARNER NORCROSS + JUDD LLP

(57) ABSTRACT

An overmolded coil assembly is provided and includes a body having a generally hollow cylindrical shape and including a central aperture and an inner surface defining a recess. A spool is received in the recess of the body. The spool includes an annular barrel and has opposite first and second ends. The first end is adjacent the central aperture of the body. A coil of electrically conductive wire is disposed in and circumferentially surrounds the annular barrel of the spool. A washer having inner and outer surfaces is adjacent the second end of the spool. An overmold made of an electrically insulative material covers the spool, the coil, the washer, and the body to seal around the spool, the coil, the washer, and the body. A fuel pump including the overmolded coil assembly and a method of sealing a coil assembly are also provided.

12 Claims, 7 Drawing Sheets

(56) References Cited

U.S. PATENT DOCUMENTS

| | | | | |
|---|---|---|---|---|
| 7,401,594 | B2 | 7/2008 | Usui et al. | |
| 7,845,617 | B2 * | 12/2010 | Cobianchi | F02M 63/0019 335/297 |
| 10,683,825 | B1 * | 6/2020 | Perry | F02M 63/0021 |
| 10,947,942 | B2 | 3/2021 | Stritzel et al. | |
| 2008/0251747 | A1 | 10/2008 | Cobianchi et al. | |
| 2009/0291575 | A1 * | 11/2009 | Henry | H01F 7/06 439/89 |
| 2011/0285484 | A1 * | 11/2011 | Hoppe | H01F 7/081 335/229 |
| 2015/0083948 | A1 * | 3/2015 | Bleeck | F02M 63/0015 251/129.19 |
| 2020/0173391 | A1 | 6/2020 | Perry et al. | |
| 2022/0131440 | A1 | 4/2022 | Saito et al. | |
| 2022/0364535 | A1 * | 11/2022 | Kaswer | F02M 59/367 |

FOREIGN PATENT DOCUMENTS

| | | | | | |
|---|---|---|---|---|---|
| IT | TO990571 | A1 | | 1/2001 | |
| WO | WO-2020175048 | A1 | * | 9/2020 | H02K 5/24 |
| WO | WO-2024008737 | A1 | * | 1/2024 | F02M 59/366 |

* cited by examiner

OVERMOLDED COIL ASSEMBLY FOR A FUEL PUMP

FIELD OF THE INVENTION

The disclosure generally relates to a fuel pump which supplies fuel to an internal combustion engine, and more particularly to a coil assembly for operating a valve of the fuel pump.

BACKGROUND OF THE INVENTION

Fuel systems in modern internal combustion engines fueled by gasoline, particularly for use in the automotive market, employ gasoline direct injection (GDi) where fuel injectors are provided which inject fuel directly into combustion chambers of the internal combustion engine. In such systems employing GDi, fuel from a fuel tank is supplied under relatively low pressure by a low-pressure fuel pump which is typically an electric fuel pump located within the fuel tank. The low-pressure fuel pump supplies the fuel to a high-pressure fuel pump which typically includes a fuel pump housing and a pumping plunger which is reciprocated, by a camshaft of the internal combustion engine, within the fuel pump housing. Reciprocation of the pumping plunger further pressurizes the fuel in order to be supplied to fuel injectors which inject the fuel directly into the combustion chambers of the internal combustion engine. During operation, the internal combustion engine is subject to varying demands for output torque. In order to accommodate the varying output torque demands, the mass of fuel delivered by each stroke of the pumping plunger must also be varied. One strategy to vary the delivery of fuel by the high-pressure fuel pump is to use an inlet valve assembly which includes a solenoid. The inlet valve assembly (i.e., spill valve) may allow a full charge of fuel to enter the pumping chamber during each intake stroke, however, the solenoid may be operated to cause the inlet valve assembly to remain open during a portion of a compression stroke of the pumping plunger to allow some fuel to spill back toward the source. When the solenoid is then operated to allow the inlet valve assembly to close, the remainder of the compression stroke pressurizes the fuel and discharges the fuel to the fuel injectors.

In order to prevent leakage of fuel a sealing arrangement is provided to seal between the fuel pump housing and the inlet valve assembly. In some arrangements such as provided in U.S. Pat. No. 10,947,942 to Stritzel et al., a portion of the inlet valve assembly is welded to fuel pump housing in order to provide a sealed interface. In other arrangements such as provided in U.S. Pat. No. 7,401,594 to Usui et al., the inlet valve assembly may be sealed to the fuel pump housing by providing an O-ring radially between the inlet valve assembly and the fuel pump housing. In each case, the sealing arrangement is provided for preventing fuel from exiting the fuel pump housing between the inlet valve assembly and the fuel pump housing. Despite these measures, portions of the inlet valve assembly which extend outside of the fuel pump housing may be exposed to environmental conditions which may cause liquids, such as rainwater or saltwater from deiced roadways, from being deposited on the inlet valve assembly. These liquids may seep into interfaces of components that form the inlet valve assembly or solenoid and over time may compromise one or more of the components of the inlet valve assembly or solenoid which may lead to undesired operation of the inlet valve assembly and/or leakage of fuel.

Particularly, in some arrangements the inlet valve assembly includes a solenoid having a body portion (inner housing) on the fuel pump housing, and a coil assembly that mounts onto the body portion. The coil assembly includes a coil and is electrically connected to a source of electric power whereby electricity supplied to the coil actuates a magnetic pole piece in the body portion. A tight (close) clearance space exists between the coil assembly and the body portion. However, existing designs of the solenoid include multiple leak paths on the coil assembly that may allow for the penetration of water/contaminants into the tight clearance space. This tight, close proximity clearance space between the coil assembly and the body portion is susceptible to crevice corrosion when exposed to water or other contaminants that may enter through the leak paths. This crevice corrosion can generate corrosion pits on the outside surface of the body portion which over time may become perforations in the body that can generate a fuel leak.

Therefore, a need exists for a fuel pump including an inlet valve assembly in which the coil assembly minimizes or eliminates one or more of the shortcomings set forth above.

BRIEF SUMMARY

An improved coil assembly for a fuel pump is provided. The coil assembly is an overmolded coil assembly that reduces or eliminates leak paths present in previous designs. The overmolded coil assembly includes a body. The body has a generally hollow cylindrical shape and includes a central aperture and an inner surface defining a recess. A spool is received in the recess of the body. The spool includes an annular barrel and has opposite first and second ends. The first end is adjacent the central aperture of the body, and an inner surface of the barrel defines an axial hole. A coil of electrically conductive wire is disposed in and circumferentially surrounds the annular barrel of the spool. A washer having inner and outer surfaces is adjacent the second end of the spool. The inner surface of the washer defines an axial hole. An overmold made of an electrically insulative material covers the spool, the coil, the washer, and the body to seal around the spool, the coil, the washer, and the body.

In specific embodiments, the overmold, the axial hole of the spool, the axial hole of the washer, and the central aperture of the body together define a plug.

In particular embodiments, the plug is sealed by the overmold.

In particular embodiments, the plug is only open at the central aperture of the body.

In specific embodiments, the body has an outer surface, and the overmold at least partially covers the outer surface of the body.

In specific embodiments, the body includes at least one annular groove at a terminal end of the overmold.

In specific embodiments, the overmold forms an annular slot in which a portion of the body is received.

In specific embodiments, a bushing is adjacent the washer on a side of the washer opposite the spool.

In particular embodiments, the bushing has an inner annular surface defining an axial hole, and the axial hole of the bushing, the overmold, the axial hole of the spool, the axial hole of the washer, and the central aperture of the body together define a plug.

In specific embodiments, the outer surface of the washer includes at least one cutout that each defines a passage through which the overmold extends.

In particular embodiments, the overmold extends from the plug to define an electrical connector.

A fuel pump including the overmolded coil assembly is also provided. In some embodiments, the fuel pump includes a fuel pump housing with a pumping chamber defined therein and an inlet valve bore extending along an inlet valve bore axis to an exterior of the fuel pump housing. A pumping plunger reciprocates within a plunger bore such that an intake stroke of the pumping plunger increases the volume of the pumping chamber and a compression stroke of the pumping plunger decreases the volume of the pumping chamber. A solenoid assembly 1) selectively provides fluid communication between an inlet of the fuel pump and the pumping chamber and 2) selectively prevents fluid communication between the inlet of the fuel pump and the pumping chamber. The solenoid assembly includes an inner housing which is received within the inlet valve bore such that the inner housing extends to the exterior of the fuel pump housing. A pole piece made of a magnetically permeable material is located within the inner housing. The overmolded coil assembly is mated with the inner housing such that the coil circumferentially surrounds the pole piece, and electricity applied to the coil causes a magnetic attraction between the pole piece and a valve element of the solenoid assembly such that the valve element moves toward the pole piece.

In specific embodiments, the overmold, the axial hole of the spool, the axial hole of the washer, and the central aperture of the body together define a plug.

In particular embodiments, the plug is sealed by the overmold.

In particular embodiments, the plug is only open at the central aperture of the body.

In particular embodiments, the plug is mated with the inner housing.

In particular embodiments, a bushing is adjacent the washer on a side of the washer opposite the spool, the bushing has an inner annular surface, and the inner annular surface of the bushing, the overmold, the axial hole of the spool, the axial hole of the washer, and the central aperture of the body together define a plug.

In specific embodiments, the body has an outer surface, and the overmold at least partially covers the outer surface of the body.

A method of sealing a coil assembly of a fuel pump is also provided. The method includes providing a spool including an annular barrel and having opposite first and second ends, and an inner surface of the barrel defining an axial hole. The method further includes disposing a coil of electrically conductive wire in and circumferentially surrounding the annular barrel of the spool. The method further includes disposing a washer adjacent the second end of the spool, the washer having inner and outer surfaces, the inner surface of the washer defining an axial hole. The method further includes disposing a bushing adjacent the washer on a side of the washer opposite the spool, the bushing having an inner annular surface defining an axial hole. The method further includes forming an overmold made of an electrically insulative material over the spool, the coil, the washer, and the bushing, the overmold covering the spool, the coil, the washer, and the bushing. The method further includes providing a body having a generally hollow cylindrical shape and including a central aperture, an outer surface, and an inner surface defining a recess. The method further includes press fitting the overmold onto the body, such that the spool, the coil, and the washer are received in the recess of the body, and the overmold covers over at least a portion of the outer surface of the body, whereby the overmold seals around the spool, the coil, the washer, the bushing, and the body, and the overmold, the axial hole of the spool, the axial hole of the washer, and the central aperture of the body together define a plug that is sealed by the overmold.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

Referring in general to FIGS. 1-7, wherein like numerals indicate corresponding parts throughout the several views, an overmolded coil assembly for a fuel pump is illustrated and generally designated as overmolded coil assembly 60. In exemplary embodiments, the overmolded coil assembly 60 is applied to a gasoline direct injection (GDi) fuel pump 20. While the fuel pump is illustrated as a GDi pump, it should be understood that the invention is not limited to GDi pump applications, but could also be applied to other fuel/fluid pumps. The overmolded coil assembly 60 closes/blocks and seals off leak pathways present in prior art coil assemblies.

Figure 1:
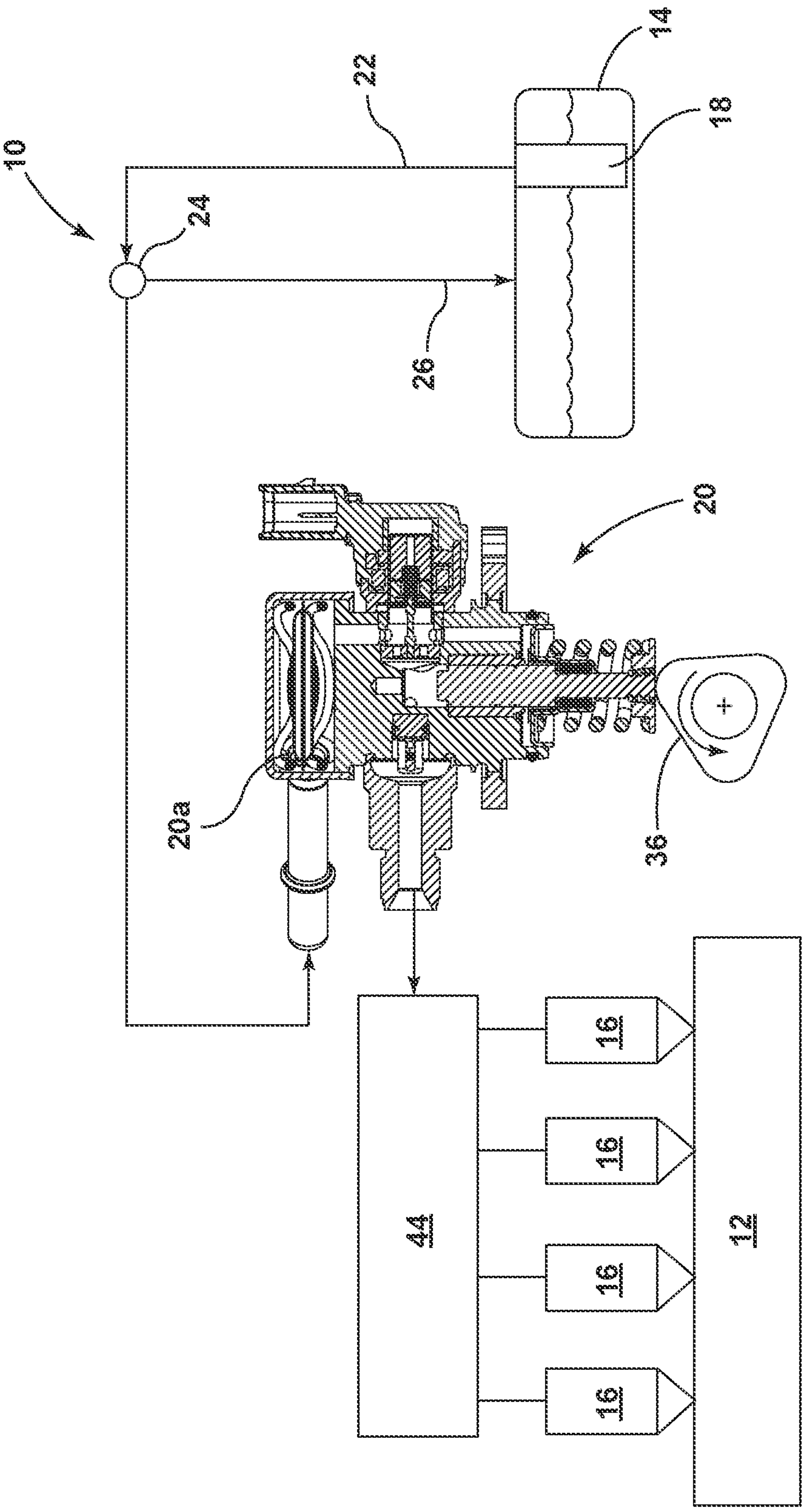
FIG. 1 is a schematic view of a fuel system including a fuel pump having an overmolded coil assembly in accordance with embodiments of the disclosure.

In an exemplary embodiment of the disclosure and referring initially to FIG. 1, a fuel system 10 for an internal combustion engine 12 is shown in schematic form. Fuel system 10 generally includes a fuel tank 14 which holds a volume of fuel to be supplied to internal combustion engine 12 for operation thereof; a plurality of fuel injectors 16 which inject fuel directly into respective combustion chambers (not shown) of internal combustion engine 12; a low-pressure fuel pump 18; and a high-pressure fuel pump 20 where the low-pressure fuel pump 18 draws fuel from fuel tank 14 and elevates the pressure of the fuel for delivery to the high-pressure fuel pump 20 where the high-pressure fuel pump 20 further elevates the pressure of the fuel for delivery to the fuel injectors 16. By way of non-limiting example only, the low-pressure fuel pump 18 may elevate the pressure of the fuel to about 500 kPa or less and the high-pressure fuel pump 20 may elevate the pressure of the fuel to above about 14 MPa and even above 35 MPa in some applications. While four fuel injectors 16 have been illustrated, it should be understood that a lesser or greater number of fuel injectors 16 may be provided, depending, for example, on the number of cylinders/combustion chambers included in the internal combustion engine.

As shown, the low-pressure fuel pump 18 may be provided within the fuel tank 14. However, the low-pressure fuel pump 18 may alternatively be provided outside of the fuel tank 14. The low-pressure fuel pump 18 may be an electric fuel pump as are well known to a practitioner of ordinary skill in the art. A low-pressure fuel supply passage 22 provides fluid communication from the low-pressure fuel pump 18 to the high-pressure fuel pump 20. A fuel pressure regulator 24 may be provided such that the fuel pressure regulator 24 maintains a substantially uniform pressure within the low-pressure fuel supply passage 22 by returning a portion of the fuel supplied by the low-pressure fuel pump 18 to the fuel tank 14 through a fuel return passage 26. While the fuel pressure regulator 24 has been illustrated in the low-pressure fuel supply passage 22 outside of the fuel tank 14, it should be understood that the fuel pressure regulator 24 may be located within the fuel tank 14 and may be integrated with the low-pressure fuel pump 18.

Figure 2:
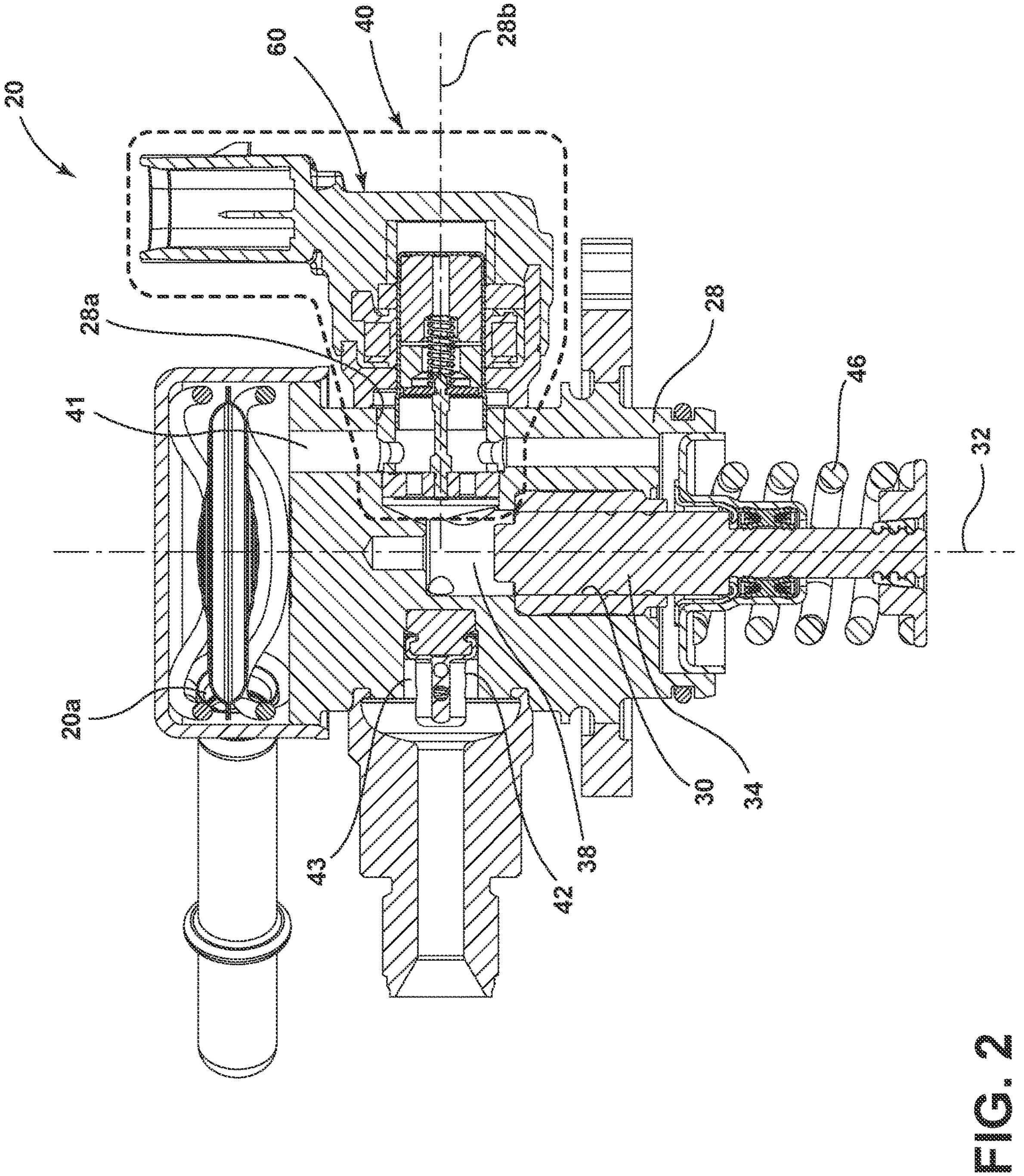
FIG. 2 is a cross-sectional view of the fuel pump of FIG. 1.

Now with additional reference to FIG. 2, the high-pressure fuel pump 20 includes a fuel pump housing 28 which includes a plunger bore 30 which extends along, and is centered about, a plunger bore axis 32. As shown, the plunger bore 30 may be defined by a combination of an insert and directly by the fuel pump housing 28. The high-pressure fuel pump 20 also includes a pumping plunger 34 which is located within the plunger bore 30 and reciprocates within the plunger bore 30 along the plunger bore axis 32 based on input from a rotating camshaft 36 of the internal combustion engine 12 (shown only in FIG. 1). A pumping chamber 38 is defined within the fuel pump housing 28, and more specifically, the pumping chamber 38 is defined by the plunger bore 30 and the pumping plunger 34. An inlet valve assembly 40 of the high-pressure fuel pump 20 is received within an inlet valve bore 28*a* of fuel pump housing 28 such that the inlet valve bore 28*a* extends to the exterior of the fuel pump housing 28, along an inlet valve bore axis 28*b* the high-pressure fuel pump 20 selectively provides and prevents fluid communication between an inlet 20*a* of the high-pressure fuel pump 20 and the pumping chamber 38 via a pump housing inlet passage 41 of the fuel pump housing 28 while an outlet valve assembly 42 is located within an outlet passage 43 of the fuel pump housing 28 and selectively allows fuel to be communicated from the pumping chamber 38 to the fuel injectors 16 via a fuel rail 44 to which each fuel injector 16 is in fluid communication. In operation, reciprocation of the pumping plunger 34 causes the volume of the pumping chamber 38 to increase during an intake stroke of the pumping plunger 34 (downward as oriented in FIG. 2) in which a plunger return spring 46 causes the pumping plunger 34 to move downward, and conversely, the volume of the pumping chamber 38 to decrease during a compression stroke (upward as oriented in FIG. 2) in which the camshaft 36 causes the pumping plunger 34 to move upward against the force of plunger return spring 46. In this way, fuel is selectively drawn into the pumping chamber 38 during the intake stroke, depending on operation of the inlet valve assembly 40 as will be described in greater detail later, and conversely, fuel is pressurized within the pumping chamber 38 by the pumping plunger 34 during the compression stroke and discharged through the outlet valve assembly 42 under pressure to the fuel rail 44 and fuel injectors 16.

Figure 3:
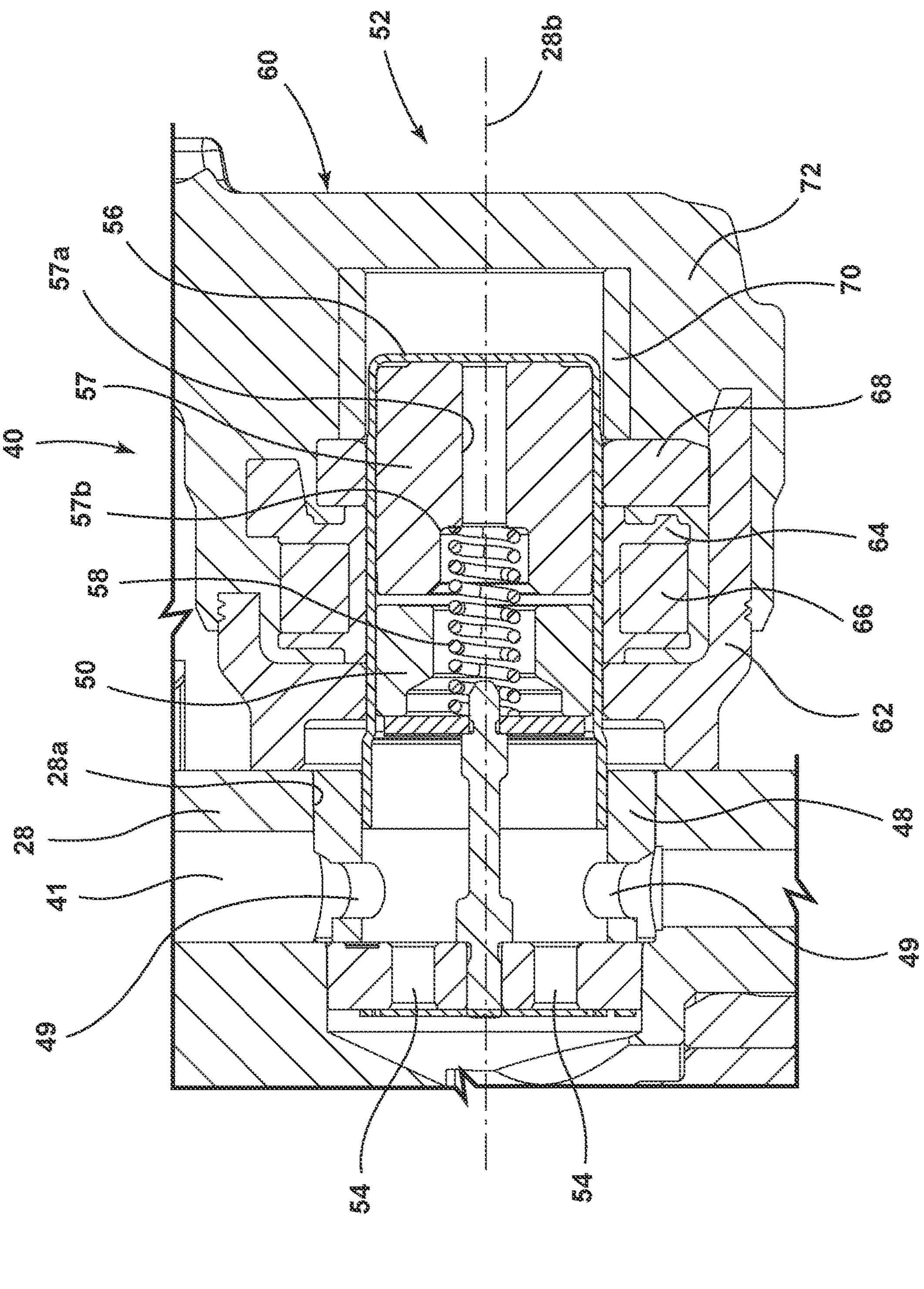
FIG. 3 is an enlargement of a portion of FIG. 2 showing an inlet valve assembly of the fuel pump including the overmolded coil assembly.
Figure 4:
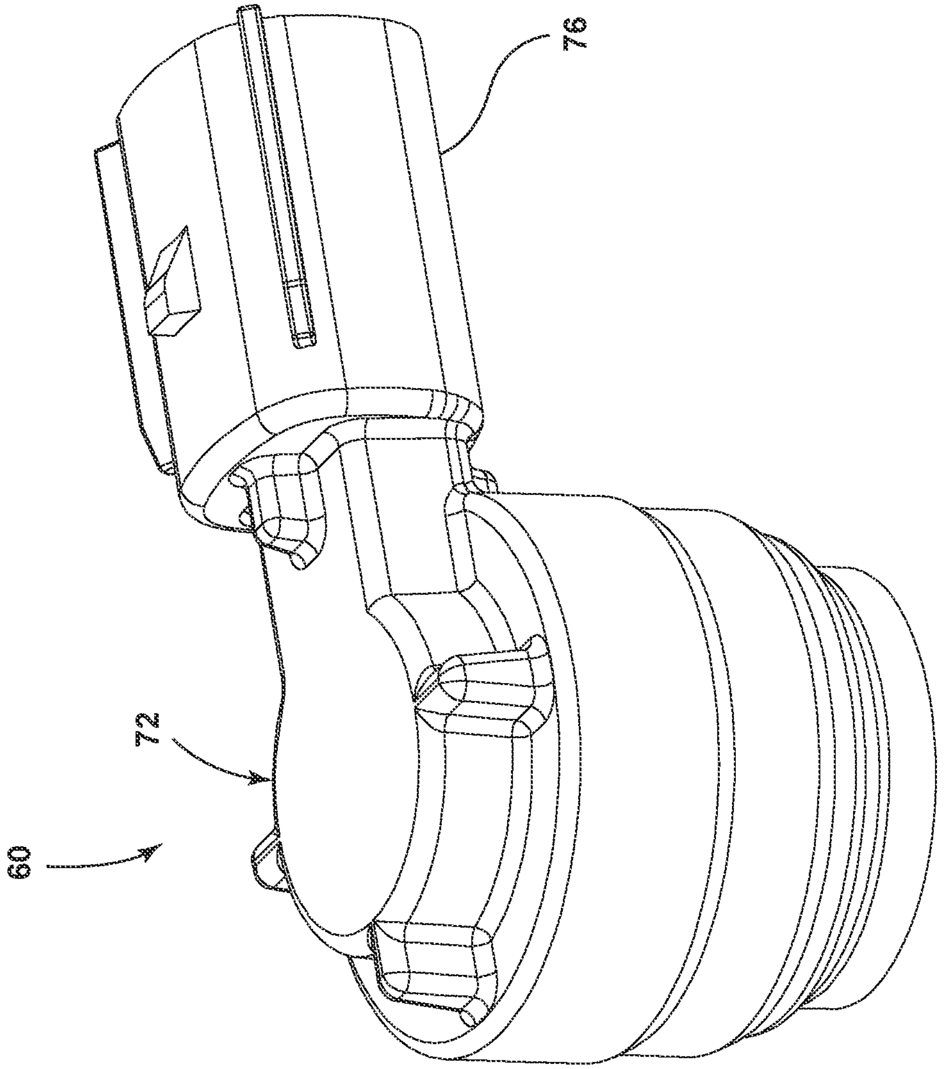
FIG. 4 is a perspective view of the overmolded coil assembly.
Figure 5:
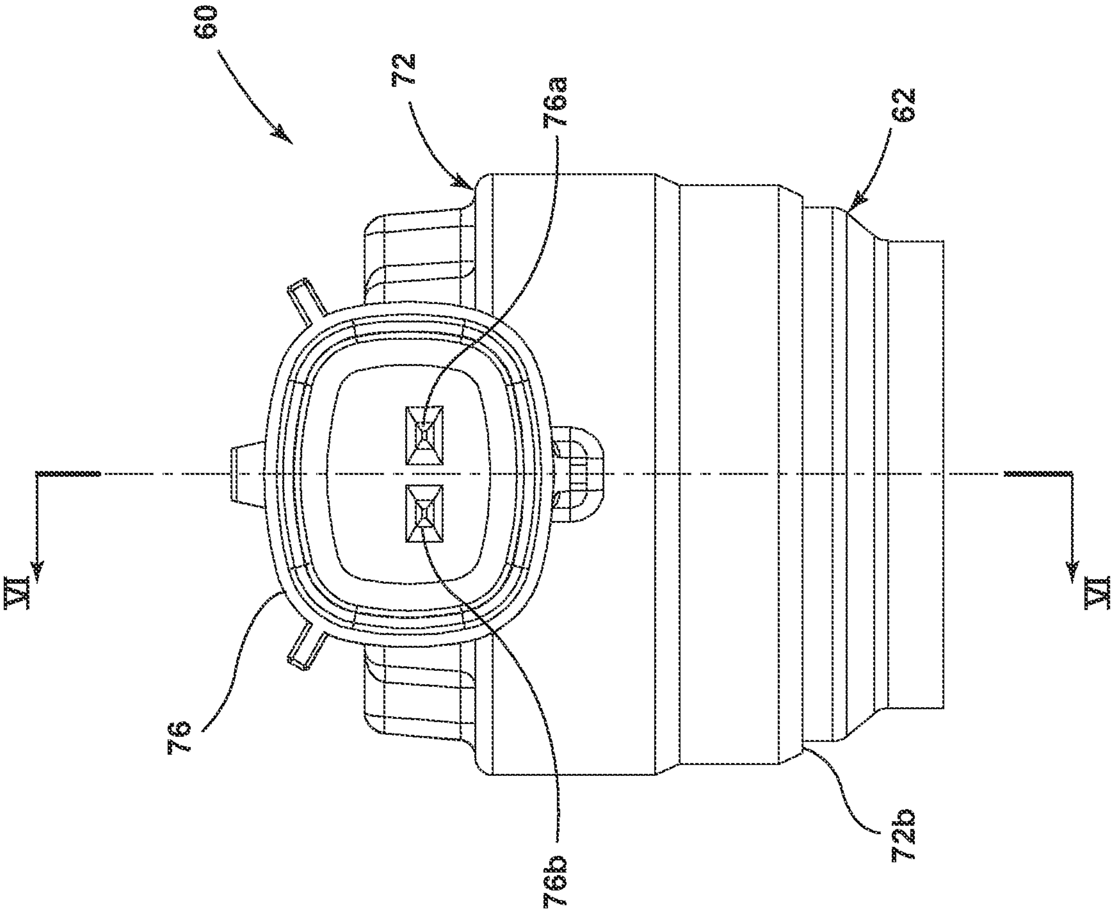
FIG. 5 is a lateral view of the overmolded coil assembly.
Figure 6:
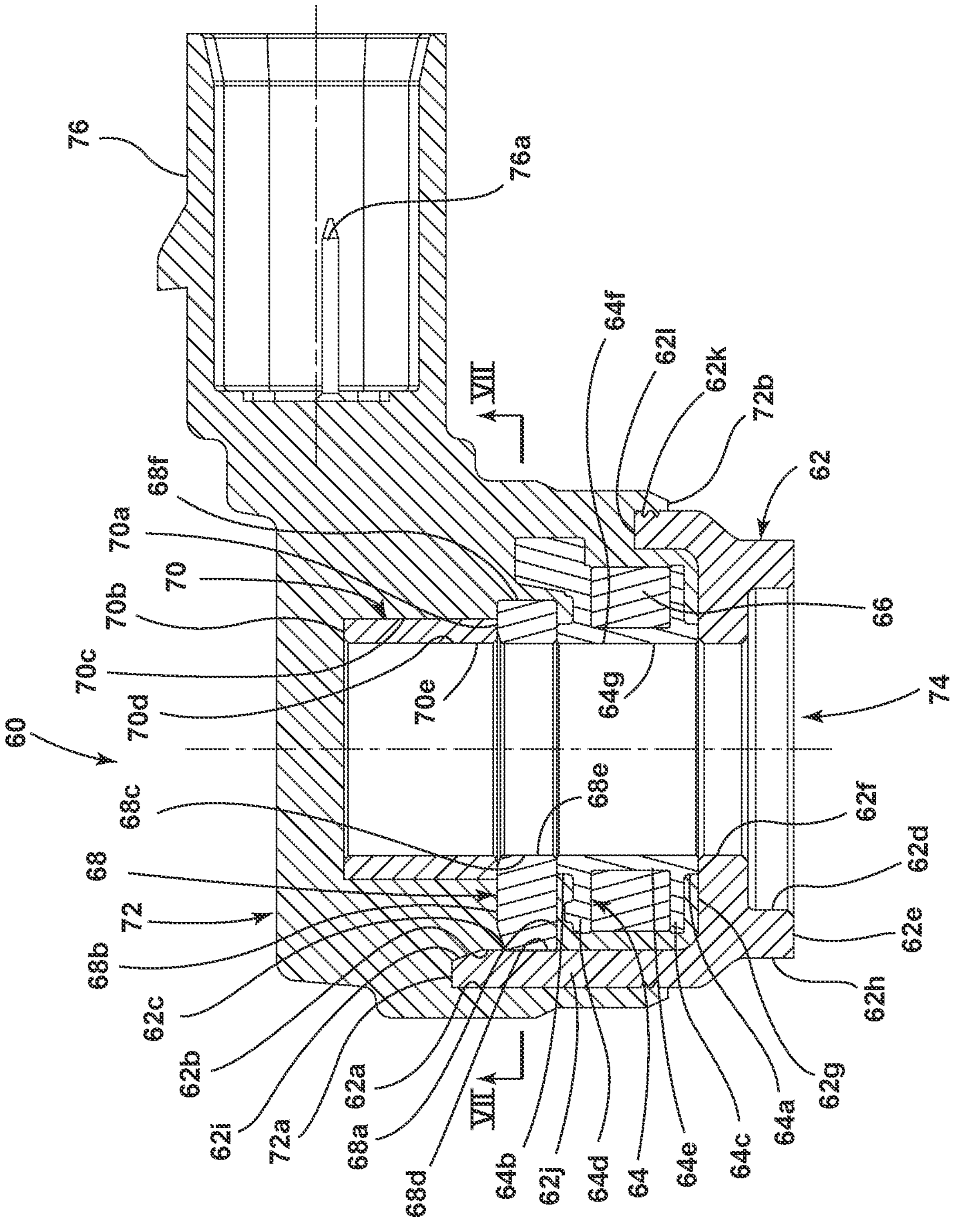
FIG. 6 is a cross-sectional view of the overmolded coil assembly taken along the line 6-6 in FIG. 5.
Figure 7:
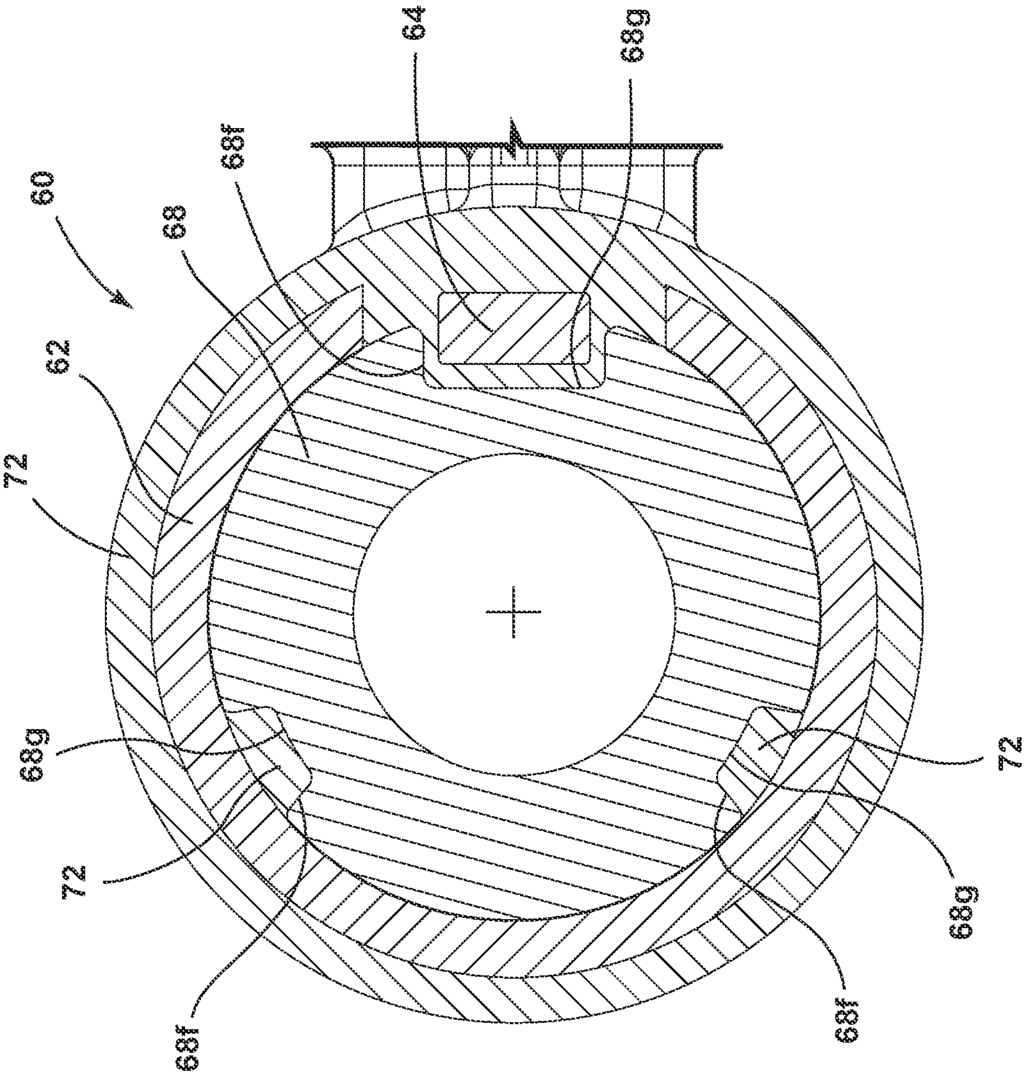
FIG. 7 is a cross-sectional view of the overmolded coil assembly taken along the line 7-7 in FIG. 6.

With particular reference now to FIG. 3, the inlet valve assembly 40 generally includes a valve body 48, a valve element 50 located within the valve body 48, and a solenoid assembly 52. The valve body 48 is cylindrical and is centered about, and extends along, the inlet valve bore axis 28*b*. The valve body 48 is in fluid communication with the pump housing inlet passage 41 via valve body inlet passages 49. The valve body 48 also includes a plurality of valve body outlet passages 54 provided in an end wall of the valve body such that the valve body 48 is in fluid communication with the pumping chamber 38. The valve element 50 is made of magnetic material and is also centered about, and extends along, the inlet bore axis 28*b*. The valve element 50 is slidable within the valve body 48 to open and close the valve body inlet passages 49.

The solenoid assembly 52 includes an inner housing 56, a pole piece 57 located within the inner housing 56, and a return spring 58. The inner housing 56 is centered about, and extends along the inlet valve bore axis 28*b*. The inner housing 56 is received within the valve body 48 such that the inner housing 56 is sealed to the valve body 48 and hence the fuel pump housing 28 in order to prevent leakage of fuel from the pump housing inlet passage 41 to the exterior of the fuel pump housing 28. This sealing may be accomplished, by way of non-limiting example only, by one or more of interference fit between the inner housing 56 and valve body 48, welding around the inner corner where the inner housing 56 meets the valve body 48, and adhesives.

The pole piece 57 is made of a magnetically permeable material and is received within the inner housing 56 such that the pole piece 57 is centered about, and extends along, the inlet valve bore axis 28*b*. A pole piece bore 57*a* extends axially through the pole piece 57 and includes a shoulder 57*b*. The return spring 58 is partially received in the pole piece bore 57*a* and abuts against the pole piece shoulder 57*b*. The return spring 58 is held in compression between the pole piece shoulder 57*b* and the valve element 50, and in this way, the return spring 58 biases the valve element 50 away from the pole piece 57.

With additional reference now to FIGS. 4-7, the solenoid assembly 52 further includes a subassembly, particularly an overmolded coil assembly 60. The coil assembly 60 includes a body 62 having a generally hollow cylindrical shape. The body 62 has an outer surface 62*a*, an opposite inner surface 62*b* that defines a recess 62*c*, and a central aperture 62*d* at one end 62*e* of the body 62 that is open to and continuous with the recess 62*c*. The body 62 further includes an inwardly extending flange 62*f* that is continuous with the inner surface 62*b* and that defines a shoulder 62*g*. The flange 62*f* extends into the central aperture 62*d* and is spaced a distance from the end 62*e* of the body. The outer diameter of the body 62 also slightly narrows at the flange 62*f* such that a portion of the body 62 between the flange 62*f* and the end 62*e* of the body 62 forms a terminal annular ring 62*h* having a diameter less than the diameter of the remainder of the body 62. The body 62 may be formed of, for example, a metal such as a stainless steel.

A spool 64 is received in the recess 62*c* of the body 62. The spool 64 has a first end 64*a* and an opposite second end 64*b*, a flange 64*c*, 64*d* at each of the first and second ends 64*a*, 64*b*, respectively, and an annular barrel 64*e* between the flanges 64*c*, 64*d*. An inner surface 64*f* of the barrel 64*e* defines an axial hole 64*g*, and the spool 64 generally has a cylindrical shape. The first end 64*a* of the spool 64 abuts against the shoulder 62*g* of the body 62 and is adjacent the central aperture 62*d* of the body 62 such that the axial hole 64*g* of the spool 64 is contiguous and essentially continuous with the central aperture 62*d*. A coil 66 of electrically conductive wire (e.g., copper wire) is disposed in and wrapped around the annular barrel 64*e* such that the coil 66 circumferentially surrounds the barrel 64*e*. The spool 64 may be formed of an electrically insulative material such as a plastic, for example but not limited to, PA66, i.e. nylon (polyamide) 66.

A washer 68 is adjacent the second end 64*b* of the spool 64 and is also disposed in the recess 62*c* of the body 62. The spool 64 is thus located axially between the washer 68 and the flange 62*f* of the body 62. The washer 68 has a first side 68*a*, an opposite second side 68*b*, an inner surface 68*c*, and an outer surface 68*d*. The first side 68*a* of the washer 68 abuts against the second end 64*b* of the spool 64. The inner surface 68*c* of the washer 68 defines an axial hole 68*e*, and the washer 68 has a generally disk-like shape. The axial hole 68*e* of the washer 68 is contiguous and essentially continuous with the axial hole 64*g* of the spool 64. The outer surface 68*d* of the washer 68 includes at least one cutout 68*f* that each defines a passage 68*g* having a purpose described in more detail below. For example, the washer 68 may include three such cutouts 68*f* which are each generally rectangular or trapezoidal wedges removed from the outer surface 68*d*. The washer 68 also provides a path for magnetic flux to pass when electric current is applied to the coil 66, and as such the washer 68 may be referred to as a flux washer. The washer may be formed of, for example, a metal such as a stainless steel.

A bushing 70 is adjacent the second side 68*b* of the washer 68 opposite the spool 64. The washer 68 is thus located axially between the spool 64 and the bushing 70. The bushing 70 extends outwardly from the recess 62*c* of the body 62 and is generally tubular in shape having a first end 70*a* abutting against the washer 68, an opposite second end 70*b*, an annular outer surface 70*c*, and an opposite annular inner surface 70*d*. The inner surface 70*d* of the bushing 70 defines an axial hole 70*e* that is contiguous and essentially continuous with the axial hole 68*e* of the washer 68. The bushing 70 may be formed of, for example, a powdered metal.

An overmold 72 made of an electrically insulative material covers the bushing 70, the spool 64, the coil 66, the washer 68, and the body 62 to seal around the bushing 70, the spool 64, the coil 66, the washer 68, and the body 62. The electrically insulative material may be a plastic such as but not limited to PA66, i.e. nylon (polyamide) 66. The bushing 70, the washer 68 and the spool 64 and coil 66 are thereby enclosed within the overmold 72. The overmold 72 also at least partially covers the outer surface 62*a* of the body 62, such as from an end 62*i* of the recess 62*c* to near the flange 62*f*. The overmold 72 thereby forms an annular slot 72*a* in which a portion of the body 62, particularly the sidewall 62*j* forming the recess 62*c*, is received. The outer surface 62*a* of the body 62 may include one or more annular grooves 62*k* at a terminal end 72*b* of the overmold 72 and proximate the flange 62*f* of the body 62. The annular groove(s) 62*k* provide an interference fit between the overmold 72 and the body 62. When forming the overmold 72, the passages 68*g* in the washer 68 allow the overmold material (e.g., plastic) to flow passed the washer into spaces between the spool 64/coil 66 and the inner surface 62*b* of the body 62.

The overmold 72, the axial hole 70*e* of the bushing 70, the axial hole 64*g* of the spool 64, the axial hole 68*e* of the washer 68, and the central aperture 62*d* of the body 62 together define a plug 74. The plug 74 is completely sealed by the overmold 72 and is only open at the central aperture 62*d* of the body 62. The plug 74 is otherwise a closed structure with no other openings. The overmold 72 thereby eliminates any leak pathways from the outside of the overmold to the body 62, the spool 64/coil 66, the washer 68, the bushing 70, and ultimately inside the plug 74. Hence, the overmold 72 prevents water and other external corrosive contaminants (e.g., salt water) from entering the tight clearance space between the plug 74 of the coil assembly 60 and the inner housing 56 of the solenoid assembly 52.

The overmold 72 extends from the plug 74 to define an electrical connector 76. The electrical connector 76 includes a pair of electrical terminals 76*a*, 76*b* that mate with a complementary electrical connector (not shown) connected to the source/supply of electricity/electric current so that one or more electrical signals can be supplied to the coil 66 to operate the inlet valve 40. The body 62 has a reduced height portion 621 which forms a cutout for the electrical connection of opposite ends of the coil 66 to the pair of terminals 76*a*, 76*b*.

When the coil assembly 60 is mounted on the fuel pump 20 by mating the plug 74 of the coil assembly 60 with the inner housing 56, the spool 64, the washer 68, and the bushing 70 are centered about, and extend along, the inlet valve bore axis 28*b* such that the spool 64 and associated coil 66 circumferentially surround the inner housing 56 in a close-fitting relationship. Consequently, when the coil 66 is energized with an electric current, the valve element 50 is magnetically attracted to, and moved toward, the pole piece 57 and when coil 66 is not energized with an electric current, the valve element 50 is moved away from pole piece 57 by the return spring 58, thus permitting or closing flow of fuel from the inlet passage 41 to the pumping chamber 38.

In some embodiments, a method of making the overmolded coil assembly 60 includes forming the overmold 72 over the spool 64, coil 66, washer 68, and bushing 70, and simultaneously forming the annular slot 72*a* in the overmold 72. Subsequently, the overmold 72 is press fit onto the body 62 such that the sidewall 62*j* of the body 62 is fit into the annular slot 72*a* and the terminal end 72*b* of the overmold 72 engages the annular grooves 62*k* on the outer surface 62*a* of the body 62. In this configuration, the overmold 72 seals around the spool 64, the coil 66, the washer 68, the bushing 70, and the body 62 to eliminate any leak paths into the plug 74.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

The invention claimed is:

1. An overmolded coil assembly for a fuel pump, the overmolded coil assembly comprising:

a body, the body having a generally hollow cylindrical shape and including a central aperture and an inner surface defining a recess;

a spool received in the recess of the body, the spool including an annular barrel and having opposite first and second ends, the first end being adjacent the central aperture of the body, and an inner surface of the annular barrel defining an axial hole;

a coil of electrically conductive wire disposed in and circumferentially surrounding the annular barrel of the spool;

a washer having inner and outer surfaces, the inner surface of the washer defining an axial hole, the washer being adjacent the second end of the spool;

a bushing having an inner annular surface defining an axial hole, the bushing adjacent the washer on a side of the washer opposite the spool; and an overmold made of an electrically insulative material and which covers the spool, the coil, the washer, the bushing and the body to seal around the spool, the coil, the washer, the bushing and the body;

wherein the overmold, the axial hole of the spool, the axial hole of the washer, the axial hole of the bushing, and the central aperture of the body together define a plug, and the plug is completely sealed by its overmold such that the overmold thereby eliminates any leak pathways from outside of the overmold to inside the plug.

2. The overmolded coil assembly of claim 1, wherein the plug is only open at the central aperture of the body.

3. The overmolded coil assembly of claim 1, wherein the body has an outer surface, and the overmold at least partially covers the outer surface of the body.

4. The overmolded coil assembly of claim 1, wherein the body includes at least one annular groove at a terminal end of the overmold.

5. The overmolded coil assembly of claim 1, wherein the overmold forms an annular slot in which a portion of the body is received.

6. The overmolded coil assembly of claim 1, wherein the outer surface of the washer includes at least one cutout that each defines a passage through which the overmold extends.

7. The overmolded coil assembly of claim 1, wherein the overmold extends from the plug to define an electrical connector.

8. The fuel pump including the overmolded coil assembly of claim 1.

9. A fuel pump comprising:

a fuel pump housing with a pumping chamber defined therein and an inlet valve bore extending along an inlet valve bore axis to an exterior of said fuel pump housing;

a pumping plunger which reciprocates within a plunger bore such that an intake stroke of said pumping plunger increases volume of said pumping chamber and a compression stroke of said pumping plunger decreases volume of said pumping chamber; and a solenoid assembly which 1) selectively provides fluid communication between an inlet of said fuel pump and said pumping chamber and 2) selectively prevents fluid communication between said inlet of said fuel pump and said pumping chamber, said solenoid assembly comprising:

an inner housing which is received within said inlet valve bore such that said inner housing extends to the exterior of said fuel pump housing;

a pole piece made of a magnetically permeable material located within said inner housing; and the overmolded coil assembly of claim 1;

wherein said overmolded coil assembly is mated with said inner housing such that said coil circumferentially surrounds said pole piece, and electricity applied to the coil causes a magnetic attraction between said pole piece and a valve element of said solenoid assembly such that said valve element moves toward said pole piece.

10. The fuel pump of claim 9, wherein the plug is only open at the central aperture of the body.

11. The fuel pump of claim 9, wherein the plug is mated with the inner housing.

12. A method of sealing a coil assembly of a fuel pump, the method comprising:

providing a spool, the spool including an annular barrel and having opposite first and second ends, and an inner surface of the annular barrel defining an axial hole;

disposing a coil of electrically conductive wire in and circumferentially surrounding the annular barrel of the spool;

disposing a washer adjacent the second end of the spool, the washer having inner and outer surfaces, the inner surface of the washer defining an axial hole;

disposing a bushing adjacent the washer on a side of the washer opposite the spool, the bushing having an inner annular surface defining an axial hole;

forming an overmold made of an electrically insulative material over the spool, the coil, the washer, and the bushing, the overmold covering the spool, the coil, the washer, and the bushing;

providing a body having a generally hollow cylindrical shape and including a central aperture, an outer surface, and an inner surface defining a recess;

press fitting the overmold onto the body, such that the spool, the coil, and the washer are received in the recess of the body, and the overmold covers over at least a portion of the outer surface of the body, whereby the overmold seals around the spool, the coil, the washer, the bushing, and the body press fitting the overmold onto the body, such that the spool, the coil, and the washer are received in the recess of the body, and the overmold covers over at least a portion of the outer surface of the body, whereby the overmold seals around the spool, the coil, the washer, the bushing, and the body, and the overmold, the axial hole of the spool, axial hole of the washer, the axial hole of the bushing, and the central aperture of the body together define a plug that is completely sealed by its overmold such that the overmold thereby eliminates any leak pathways from outside of the overmold to inside the plug.

* * * * *